United States Patent
Vanhentenrijk et al.

(10) Patent No.: US 7,499,621 B2
(45) Date of Patent: Mar. 3, 2009

(54) PROTECTIVE CASING COMPONENT AND AN ELEMENT FOR FORMING A PROTECTIVE CASING COMPONENT

(75) Inventors: Robert Vanhentenrijk, Winksele (BE); Joris Franckx, Bonheiden (BE)

(73) Assignee: Tyco Electronics Raychem NV, Kessel (BE)

( * ) Notice: Subject to any disclaimer, the term of this patent is extended or adjusted under 35 U.S.C. 154(b) by 146 days.

(21) Appl. No.: 10/570,360

(22) PCT Filed: Sep. 3, 2004

(86) PCT No.: PCT/GB2004/003767

§ 371 (c)(1), (2), (4) Date: Mar. 1, 2006

(87) PCT Pub. No.: WO2005/027290

PCT Pub. Date: Mar. 24, 2005

(65) Prior Publication Data

US 2006/0285810 A1 Dec. 21, 2006

(30) Foreign Application Priority Data

Sep. 16, 2003 (GB) ................. 0321680.1

(51) Int. Cl.
G02B 6/00 (2006.01)
(52) U.S. Cl. ..................................... 385/135
(58) Field of Classification Search ............. 385/134, 385/135
See application file for complete search history.

(56) References Cited

U.S. PATENT DOCUMENTS

| 4,880,676 | A |   | 11/1989 | Puigcerver et al. | ........ 428/35.7 |
| 5,059,748 | A |   | 10/1991 | Allen et al. | .................. 174/87 |
| 5,675,124 | A | * | 10/1997 | Stough et al. | ............... 174/656 |
| 5,777,268 | A | * | 7/1998 | Allen et al. | .............. 174/74 A |
| 5,825,961 | A | * | 10/1998 | Wilkins et al. | .............. 385/135 |
| 6,025,561 | A | * | 2/2000 | Dams | .......................... 174/91 |

FOREIGN PATENT DOCUMENTS

WO  WO 99/49548 A  9/1999

* cited by examiner

Primary Examiner—Sung H Pak
Assistant Examiner—Daniel Petkovsek
(74) Attorney, Agent, or Firm—Baker & Daniels LLP

(57) ABSTRACT

A protective casing base component adapted to act as a base part of an optical fiber splice enclosure of the type including a generally tubular housing having an open end and a closed end and including means for sealing the enclosure including means for sealing the open end of the housing to the said casing component so that a plurality of optical fiber cables can pass into and out of the enclosure in use through an opening in the said component for the individual optical fibers in the cables to be spliced or connected to other such optical fibers within the enclosure, characterized in that the casing component is formed in such a way that it can be positioned or removed from a cable or plurality of cables at an intermediate point along the length thereof without interrupting the continuity of the cables, and having means for sealing the interior of the enclosure from external agencies.

9 Claims, 3 Drawing Sheets

PROTECTIVE CASING COMPONENT AND AN ELEMENT FOR FORMING A PROTECTIVE CASING COMPONENT

The present invention relates generally to a protective casing component and particularly to an element for forming a protective casing component.

The present invention finds particular application in the field of optical fibre telecommunications technology.

Where it is necessary to join or splice optical fibres this is usually done in a rack or frame within the interior of a building protected from the elements. There are, however, some circumstances where it is necessary to form splices in optical fibres outside buildings, and in these circumstances it is known to use enclosures which protect the splices from the effects of weather and other atmospheric agents such as moisture, dust etc.

Optical fibres for use in telecommunications systems are generally grouped together in bundles separated from one another by protective sheaths, and these sheaths, sometimes referred to as "loose tubes" are themselves grouped together within an outer cable casing. One cable may, for example, comprise 16 loose tubes, with each loose tube enclosing a plurality, for example 12, optical fibres. The maximum of the enclosure is thus 192 fibres (16×12). The total cable capacity is 6 cables per enclosure.

Optical fibre splice enclosures of the "freestanding" type, that is housing splices made in the field at a point remote from a network node which may comprise a rack of shelves in a frame or cabinet housed in a building, may be buried underground (where the optical fibres are located in ducting) or the cables may be brought up to a post to which the optical fibre splice enclosure may be fitted for easier access. In either circumstance there is occasionally a risk that the enclosure casing may become damaged or broken either because of its exposed location on a pole or, even if buried, because of the effects of ground movement, traffic passing above the duct, or too-close working of excavation equipment.

It will be appreciated that the very large number of splices contained within a single optical fibre splice enclosure constitute a logistical problem if the entire enclosure needs replacement. In the first place the communications network may have a so-called "lifeline" status, meaning that certain of the connections must not be disrupted, or alternative connections must be put in place before they can be separated. However, in the prior art optical fibre splice enclosures, the necessity for sealing the interior of the enclosure, and therefore for the cables to pass through a sealed opening, has necessarily resulted in the need for separation of all the splices and remaking of these if a splice enclosure becomes damaged and needs replacement.

It will be appreciated at this point that the enclosure is a robust protective element which protects the delicate interior structure of the splice couplings from physical damage as well as from the elements. Damage to the casing which is sufficient to prevent it from continuing to perform its function of protecting the interior of the casing from the elements may, however, occur without resulting in damage to the interior components so that replacement of the casing, although necessary in order to maintain protection from the elements, is nevertheless an entirely tedious and laborious operation due to the necessity of unmaking all of the splice connections in order to withdraw the optical fibre cables through the openings in the casing, and then remaking of more splice connections in a new enclosure.

The present invention seeks to provide a solution in which the problem of replacement of broken optical fibre splice enclosure casings can be mitigated at least to some extent by allowing replacement of an enclosure casing without requiring the expensive, time-consuming, and laborious operations involved in breaking and remaking the splice connections.

According to one aspect, the present invention, a protective casing base component adapted to act as a base part of an optical fibre splice enclosure of the type including a generally tubular housing having an open end and a closed end and including means for sealing the enclosure including means for sealing the open end of the housing to the said casing component so that a plurality of optical fibre cables can pass into and out of the enclosure in use through an opening in the said component for the individual optical fibres in the cables to be spliced or connected to other such optical fibres within the enclosure, characterised in that the casing component is formed in such a way that it can be positioned or removed from a cable or plurality of cables at an intermediate point along the length thereof without interrupting the continuity of the cables, and having means for sealing the interior of the enclosure from external agencies.

The protective casing component of the present invention may comprise two parts which can be secured together around the fibre or fibre cables to be enclosed.

In an alternative embodiment, however, the protective casing component comprises a single element having a longitudinal slot or slit in the wall thereof through which an intermediate part of an optical fibre or fibre cable can be passed laterally thereof, the said wall being at least partly flexible and/or resilient and the said casing sealing means including means for sealing the said longitudinal slit or slot in a closure condition.

In embodiments of the invention in which the protective casing component comprises two parts, the said two parts of the component (or in embodiments comprising a single element with a longitudinal slot, the parts thereof on either side of the said slit or slot) are held together by fixing means extending transversely of the facing edges of the two parts or of the slit or slot.

The protective casing component of the invention may, moreover, alternatively comprise a plurality of elements which can be assembled together to form a composite component sealed against the ingress of external agents.

The present invention may be embodied in a protective casing component in which the elements thereof and/or the facing edges of the longitudinal slit or slot thereof, are sealed together by gel elements interposed between cooperating facing surfaces of the parts of the component.

In a preferred embodiment of the invention the component is the base part of an optical fibre splice enclosure including a generally tubular housing having an open end and a closed end, and means for sealing the open end of the housing to the closed or assembled casing component.

In such an embodiment the component may comprise a semi-cylindrical body having a generally radial flange at one end thereof and two generally longitudinal edges in the face of one of which there is an axially extending channel and in the face of the other of which there is a cooperating axially extending ridge which projects into the channel when the two such elements are fitted together.

An element as defined hereinabove may have an annular skirt portion extending axially away from the said radial flange to form a seat for sealant gel between the casing component formed from two such elements and the open end of a tubular housing.

An element formed according to this aspect of the present invention may also be so configured that the said axial groove in the face of one longitudinal edge communicates with the seat region defined by the said radial flange of the said annular skirt portion of the element to allow a continuous bead of gel to extend around the annular region of the end of the component and axially along the interface between the two elements of which it is composed.

The present invention also comprehends an optical fibre splicing enclosure comprising a casing component (which may be made from casing component elements as hereinabove defined) in the form of a base for a generally tubular housing which can be sealed to one end of the component and a gel block which can be fitted in the other to allow sealed entry and exit of optical fibre cables to and from the interior of the enclosure.

There may further be provided one or a plurality of optical fibre organisers within the sealed interior of the fibre splice enclosure, formed by assembly of the housing to the base and sealing thereof.

One embodiment of the present invention will now be more particularly described, by way of example, with reference to the accompanying drawings, in which.

Figure 1:
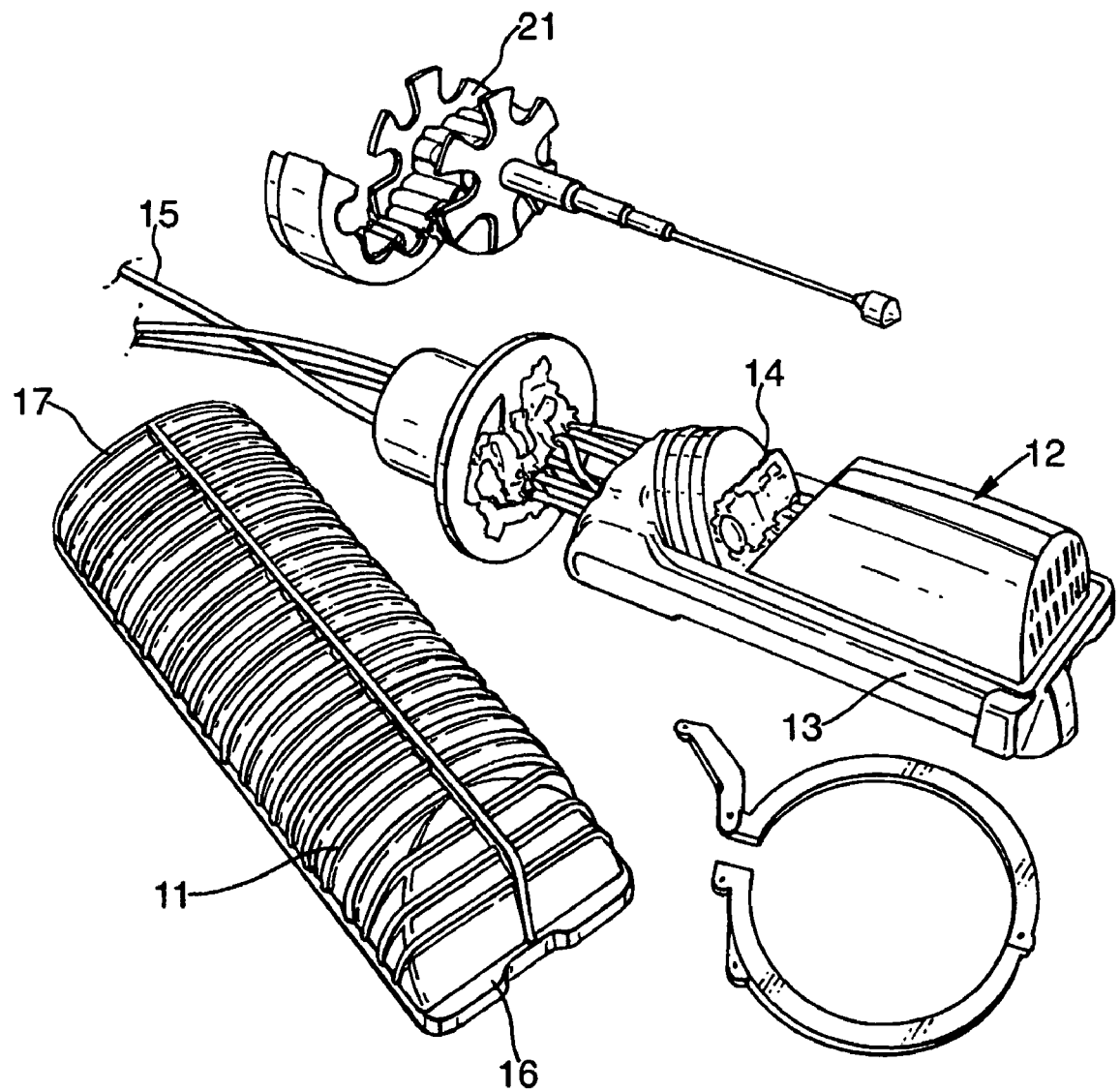
FIG. 1 is a perspective view, dismantled, of a prior art optical fibre splice enclosure of the type to which the present invention relates.

Referring first to FIG. 1, an optical fibre splice enclosure of known form comprises a generally cylindrical outer envelope or casing 11 within which is housed a fibre splice organiser generally indicated 12 comprising a plurality of individual fibre splice connectors 13 and a plurality of storage trays 14 for overlength fibre, hinged in association therewith so that the surplus or overlength of optical fibre needed to allow changes to be made to the connections after its first installation, can be stored tidily.

As explained above, the optical fibres are housed in bundles within loose tubes which are themselves located within optical fibre cables such as the cables 15 illustrated in FIG. 1. Access to the fibres involves removal of a section of the cable sheath to enclose the exposed loose tubes, followed by partial or complete removal of the tube wall of one or more of the exposed loose tubes to reveal the enclosed optical fibres. The removal of the tube wall is commonly called "shaving" the tube, this being a necessarily delicate operation requiring care to avoid damage to the revealed optical fibres. The exposed lengths of optical fibres are housed on the overlength storage trays 14.

The tubular casing 11 has a closed end 16 and an open end 17, and the entire organiser 12 is introduced into its interior through the open end 17. This open end is sealed to a base 18 which comprises a generally cylindrical body 19 having a radial flange 20 which contacts and is sealed to the open end of the enclosure tube 17. The tubular body 19 houses a gel block generally indicated 21, one example of which is shown outside the base 18 in FIG. 1 (although the interior of the base 18 is also shown housing a gel block through which the optical fibre cables 15 pass into the interior of the enclosure tube 11.

As will be appreciated, if the casing 11 becomes cracked or broken it is a simple matter to remove this and replace it with another, reinstating the seal between the open end 17 and the flange 20 of the base 18. If, however, the base 18 itself becomes damaged there is no way in which a new base can be fitted without separating all the optical fibre splices to allow axial withdrawal of the optical fibre cables 15 through the gel block 21 housed in the base 18 itself. In communications networks where the optical fibres 15 have "lifeline" status this cannot be done without providing duplicated connections to cover the period of disconnection of the optical fibres. The very large number of fibres and the potential for subsequent misconnections when the splices are remade is evident.

Figure 2:
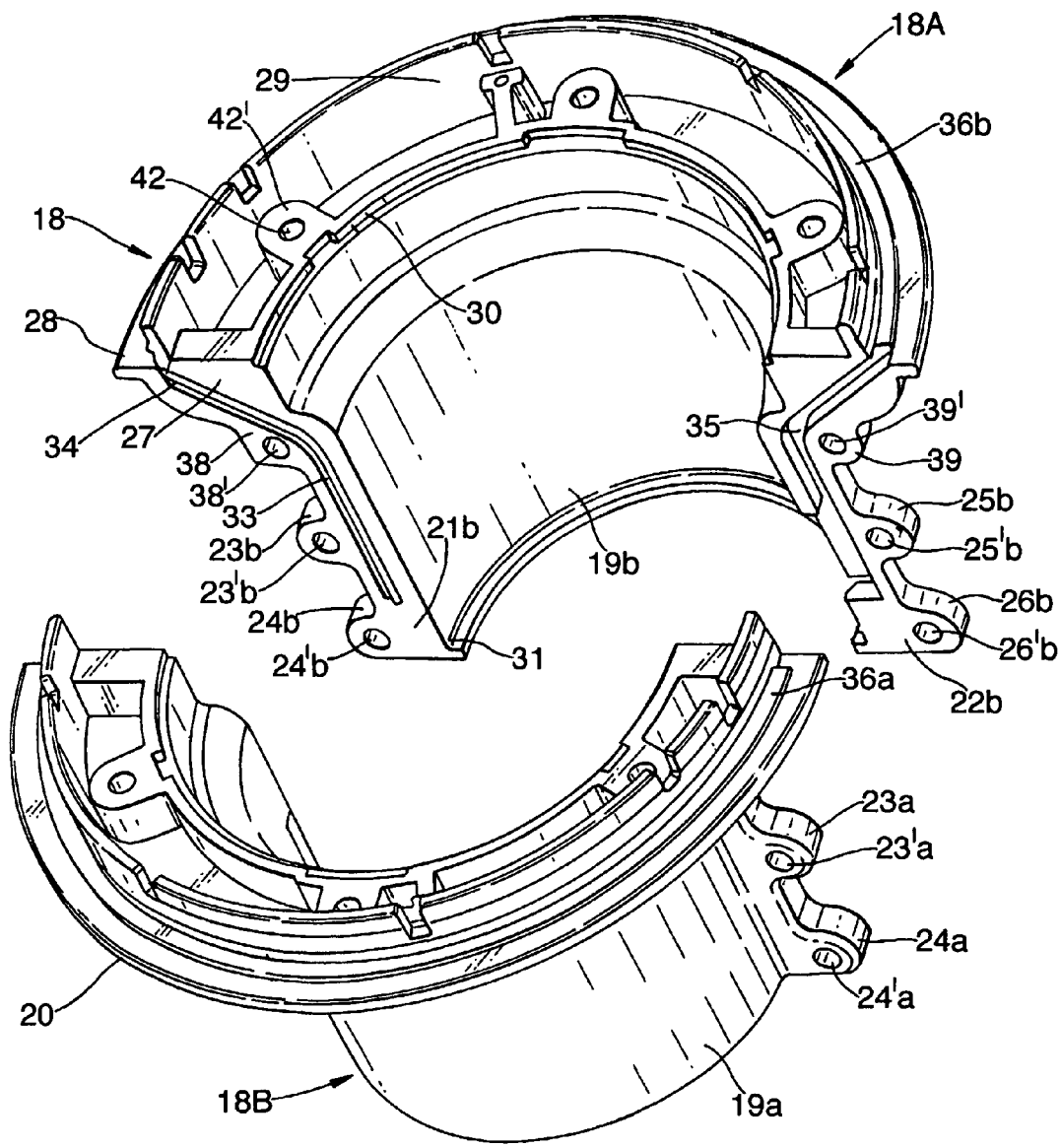
FIG. 2 is an exploded view of a component constituting an embodiment of the present invention comprising two elements.
Figure 3:
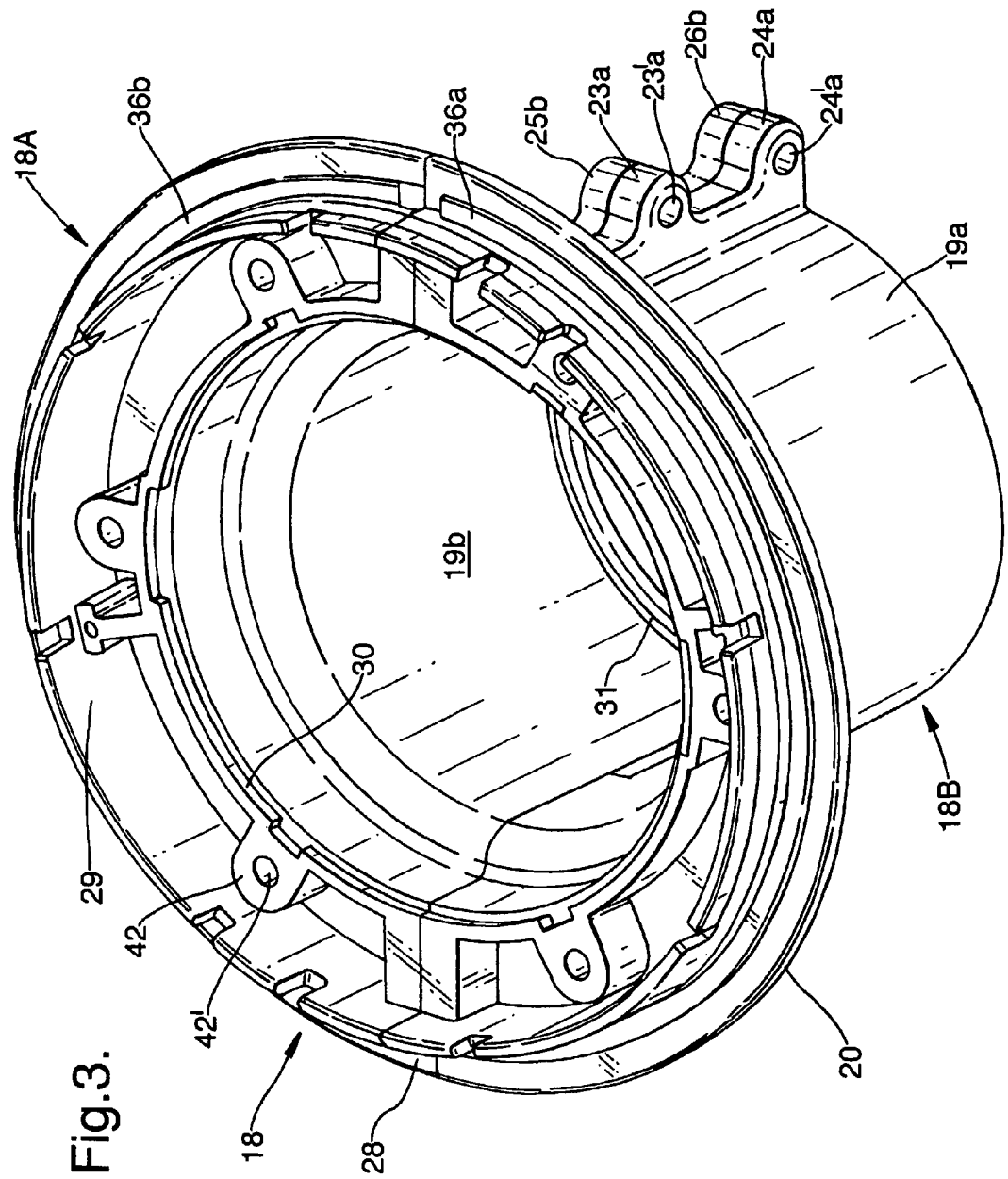
FIG. 3 is a perspective view of the component of the present invention with the two elements thereof fitted together.

FIG. 2 illustrates an embodiment of the invention which allows replacement of the base 18 without requiring separation of all the splices on the splice block 13. This base 18 comprises, like the prior art base, a tubular body 19 having a radial flange generally indicated 20. In this embodiment, however, the base 18 is formed in two parts 18a, 18b each identical to one another and each comprising a semi-cylindrical body portion 19a, 19b having flat axially extending edge faces 21, 22 (only the edge faces 21, 22b of the semi-cylindrical portion 19b being visible in FIG. 2.

Projecting radially from the semi-cylindrical body 19a, 19b and flush with the edge faces 21, 22 are respective pairs of lugs 23, 24 and 25, 26. Each lug is pierced by a respective hole 23b', 24b', 25b', 26b'. At one axial end of the semi-cylindrical body 19 is a conically tapered portion 27 from the free edge of which projects a radial flange 28 and a radially outer axial skirt 29. A second, radially inner axial skirt portion 30 projects parallel to the axial skirt 29 from a root portion of the conical portion 27.

At the other end of the semi-cylindrical body 19 from that bearing the conical portion 27 is a small radially inwardly directed lip 31 against which, in use, engages a gel block such as the block 21 illustrated in FIG. 1. The flat edge face 21b of the semi-cylindrical body 19b bears a projecting ridge 33 and this ridge extends into the conical portion 27, terminating at an outer end 34 close to the junction between the radial flange 28 and the radially outer axial skirt 29. The other flat edge face 22b of the semi-cylindrical body 19b has a channel 35 of similar shape extending along the length of the flat edge face 22b and the corresponding end face of the conical portion 27, terminating at the junction region between the radial flange 28 and the radially outer axial skirt 29, and in communication with a circumferential groove 36b which extends around the radial flange 28 at the root thereof.

The groove 35 has a laterally open region 35' on the inner face of the semi-cylindrical body 19. This enables the gel in the groove 35 to make direct contact with the gel of the gel block housed in the cylindrical portion of the base 18, engaging against the radial inner lip 31.

In use, the two parts 18a, 18b of the base 18 can be fitted together over an existing, known type of gel block (not shown, but which may be like the gel block 21) bearing existing optical fibre cables 15 and connected to a fibre splice assembly such as that represented by the reference numbers 12,13, 14 in FIG. 1, without requiring any dismantling or breaking of the connections formed by the splices. The two semi-cylindrical parts 19a, 19b are held together by bolts passing through the openings 23', 24', 25', 26' in the lugs 23, 24, 25, 26, with gel sealant located in the groove 35 to which pressure is applied by the ridge 34 as the bolts are tightened. Two further lugs 38, 39 with holes 38', 39' are located at the junction region between the semi-cylindrical body 19 and the conical portion 27 in order further to improve the axial seal formed by the ridge 34 engaging in the groove 35.

Once the two parts 18a, 18b have been fitted and sealed together and the bolts tightened, the base 18 can be used in the same way as a conventional base as illustrated in FIG. 1, with a cylindrical cover 11 being mounted thereto, engaging in the groove 36, which may also be provided with gel sealant to seal the open end 17 of the tubular casing 11 in place on the base 18.

The radially inner axial skirt 30 has a plurality of bosses 42 through which pass axial openings 42' for receiving axial bolts to secure the cylindrical casing 11 by means (not shown) so as to tighten the rim 17 of the open end of the cylindrical casing 11 into the gel in the groove 36. The communication between the groove 35 and the groove 36 ensures that the axial beads of sealant gel which seal the longitudinally extending edge faces 21, 22 together forms an essentially continuous seal with the circumferential bead of gel in the groove 36 so that this junction is not a point of potential entry of atmospheric contaminants.

The invention claimed is:

1. An optical fiber splice enclosure including a generally tubular housing having an open end and a closed end and a protective casing base component fitted to the open end of the housing, which base component has an opening through which a plurality of optical fiber cables can pass into and out of the enclosure in use for the individual optical fibers in the cables to be spliced or connected to other such optical fibers within the enclosure, wherein the base component is formed of two semi-cylindrical parts, or of a single cylindrical element having a wall which is at least partially flexible and/or resilient and has a longitudinal slit or slot in the wall through which an intermediate part of an optical fiber cable can be passed laterally thereof, whereby the base component can be positioned or removed from a cable or a plurality of cables at an intermediate point along the length thereof without interrupting the continuity of the cables, and the base component has means for sealing the interior of the enclosure from external agencies including means for sealing the open end of the housing to the said base component, and wherein the base component has (i) a generally radial flange at one end thereof and two generally parallel longitudinal edges in the face of one of which there is an axially extending channel and in the face of the other of which there is a cooperating axially extending ridge which enters the channel when the base component is fitted together around the cables; and (ii) an annular skirt portion extending axially away from the said radial flange to form a seat region for a sealant gel between the base component and the said open end of the housing; and wherein the said axial channel in the face of one longitudinal edge communicates with the seat region defined by the said radial flange and the said annular skirt portion of the base component to allow a continuous bead of gel to extend around the annular region at the end of the base component and axially along the interface between the said longitudinal edges thereof.

2. An optical fiber splice enclosure as claimed in claim 1, in which the said two parts of the base component or the parts thereof on either side of the said slit or slot are held together by fixing means extending transversely of the facing edges of the two parts or of the slit or slot.

3. An optical fiber splice enclosure as claimed in claim 1, in which the said parts of which it is composed or the facing edges of the said longitudinal slit or slot are sealed together by gel elements interposed between cooperating facing surfaces of the parts of the component.

4. An optical fiber splice enclosure as claimed in claim 1, wherein a gel block is fitted in the base component to allow sealed entry and exit of optical fibers cables to and from the interior of the enclosure.

5. An optical fiber splice enclosure as claimed in claim 1, in which there is or are further provided one or a plurality of optical fiber organizers within the sealed interior formed by assembly of the said housing to the base component.

6. An optical fiber splice enclosure, comprising:
a generally tubular housing having an open end and a closed end and a protective casing base component fitted to the open end of the housing, which base component has an opening through which a plurality of optical fiber cables can pass into and out of the enclosure in use for the individual optical fibers in the cables to be spliced or connected to other such optical fibers within the enclosure;
the base component comprising at least portions, movable relative to each other and being connected along at least one longitudinal seam comprised of two generally parallel longitudinal edges having intersecting contours forming at least one axial channel in one of said edges, whereby an intermediate part of an optical fiber cable can be passed laterally through the longitudinal seam in order that the base component can be positioned or removed from a cable or a plurality of cables at an intermediate point along the length thereof without interrupting the continuity of the cables;
a generally radial flange positioned at one end of the base component;
an annular skirt portion extending axially away from said radial flange to form a seat region for a sealant gel between the base component and said open end of the housing; and
wherein said axial channel in the face of one longitudinal edge communicates with the seat region defined by said radial flange and said annular skirt portion of the base component to allow a continuous bead of gel to extend around the annular region at the end of the base component and axially along the interface between the said longitudinal edges thereof.

7. The optical fiber splice enclosure of claim 6, wherein the base component is comprised of two discrete semi cylindrical housing portions, having two longitudinal seams formed on either side thereof.

8. The optical fiber splice enclosure as claimed in claim 6, further comprising a gel block fined in the base component to allow sealed entry and exit of optical fibers cables to and from the interior of the enclosure.

9. The optical fiber splice enclosure as claimed in claim 6, further comprising at least one optical fiber organizer within the sealed interior formed by assembly of the said housing to the base component.

* * * * *